(12) United States Patent
Gakumura et al.

(10) Patent No.: US 7,971,214 B1
(45) Date of Patent: Jun. 28, 2011

(54) ELECTRONIC DEVICE WITH AN ANTITHEFT FUNCTION AND METHOD FOR PREVENTING THEFT OF ELECTRONIC DEVICES

(75) Inventors: Hiroki Gakumura, Forrest City, AR (US); Hideki Baba, Forrest City, AR (US); Akira Tsurusaki, Forrest City, AR (US)

(73) Assignee: Sanyo Electric Co., Ltd., Moriguchi (JP)

( * ) Notice: Subject to any disclaimer, the term of this patent is extended or adjusted under 35 U.S.C. 154(b) by 894 days.

(21) Appl. No.: 11/895,849

(22) Filed: Aug. 27, 2007

(51) Int. Cl.
*H04N 7/16* (2006.01)

(52) U.S. Cl. .......................................... 725/30; 725/25

(58) Field of Classification Search ................... 725/25, 725/30
See application file for complete search history.

(56) References Cited

U.S. PATENT DOCUMENTS

| 4,987,594 A | 1/1991 | Wassink | |
| 5,282,247 A * | 1/1994 | McLean et al. | 711/164 |

FOREIGN PATENT DOCUMENTS

| JP | 2001-347894 A | 12/2001 |
| JP | 2007-81669 A | 3/2007 |

* cited by examiner

*Primary Examiner* — Hunter B Lonsberry
(74) *Attorney, Agent, or Firm* — Masuvalley & Partners (57) ABSTRACT

The present invention is a television receiver that includes a memory that stores a first lock release code, an input device to input a second lock release code, a comparing portion to compare the second lock release code to the first lock release code, and a control portion to output a signal to operate the television receiver when the result of the comparison conforms. Also the present invention includes a method for preventing theft of an electronic device that includes the steps of storing a lock release code in a memory of the electronic device, providing information corresponding to the lock release code to a third party, requesting an input of the information corresponding to the lock release code, comparing input information to the lock release code stored in the memory, and disabling the electronic device when the result of the comparison is not conforming.

4 Claims, 12 Drawing Sheets

ELECTRONIC DEVICE WITH AN ANTITHEFT FUNCTION AND METHOD FOR PREVENTING THEFT OF ELECTRONIC DEVICES

TECHNICAL FIELD

The objective of present invention is to prevent theft of electronic devices from stores and so on. That is, in the present invention, the electronic device can not be used unless an input code corresponds to a predetermined code stored in a memory which is integrated in the electronic device.

BACKGROUND OF INVENTION

Conventionally, a typical method for preventing theft of electronic devices is to, for example, embed a sensor called sensor tag on a piece of merchandise or to attach the merchandise to a carton case, and install a sensor in the doorway of a store to detect and sound a buzzer when the merchandise is removed from a store without releasing the function of the sensor at a cash register. However, the effect raises a question because the sensor tag loses its effect once it is removed, and further the electronic devices are still stolen even when the buzzer goes off.

And, Japanese published unexamined application No. 2007-81669 discloses a method for preventing theft of a television receiver. This invention is to store the contact information of a user on a television receiver, and to inform the user on the fact of theft via a network when the television receiver is determined to be stolen.

Also, the Japanese published unexamined application No. 2001-347894 discloses a theft prevention method for a motor vehicle. In this invention, in-vehicle electrical components are disabled once a vehicle is set to an armed state in case of a theft. Thereafter, the in-vehicle electrical components remain disabled unless the disabled state of the in-vehicle electrical components is released in some way. The method for releasing the in-vehicle electrical components from the disabled state is to match a unique signal stored in the antitheft device on the vehicle and an unique signal stored in a memory provided separately.

Further, U.S. Pat. No. 4,987,594 discloses an invention which disables a radio receiver or a television receiver to prevent these receivers from theft by blocking a reception signal or outputting a sound when there is no permission to use.

However, any of these inventions described above are incomplete for preventing theft of electronic devices from stores. Under this circumstance, an invention which disables merchandise from use when the merchandise is stolen, demotivates thieves, and prevents this type of crime, has been desired.

BRIEF SUMMARY OF THE INVENTION

The present invention is a television receiver consisting of a memory that stores a first lock release code, an input device to input a second lock release code, a comparing portion to compare the second lock release code input by the input device and the first lock release code stored in the memory, and a control portion to output a signal which allows the operation of the television receiver when the result of comparison in the comparing portion is verified.

By configuring as described above, the television receiver does not operate when the result of the comparison is not confirmed. Therefore, by providing the second lock release code only to those who legitimately purchase the television receiver, those who did not legitimately purchase the television receiver (for example, a thief) can not use the television receiver because he or she does not know the second lock release code. Also, there is no value in reselling the television receiver because it can not be used. In this way, thieves are demotivated, and the damage of thefts are decreased.

Also, by configuring as described above, there is no need for stores to install special devices or jigs at cash registers or store exits to prevent thefts. Thereby, a decrease in the cost for theft prevention, and also a decrease in cost from the stand point of store space can now be used for other purposes. Also, there is no need for instructing store clerks how to operate antitheft devices. In the case of the present invention, if the second lock release code is configured to be printed automatically on a receipt, there is no need to instruct store clerks on antitheft.

The first lock release code stored in the memory may be the number that corresponds to the serial number of the television receiver.

When a thief obtains the second lock release code of the television receiver, other television receivers can be used if a plurality of television receivers share the same second lock release code and those receivers were stolen. Thieves have tendency of repeating a theft. However, by configuring a television receiver as described above, thefts of other television receivers can be prevented even if a certain second lock release code has been stolen because each television receiver is provided with a different second lock release code.

The first lock release code corresponding to the serial number may be stored in the memory at a production process of the television receiver.

The second lock release code may be distributed at the time of purchase of the television receiver.

By configuring as described above, it does not cause extra trouble to a purchaser of the television receiver.

The control portion checks as to whether the result of the comparison at the comparing portion is verified or not, and the television receiver may block image display when the result is not confirmed.

The control portion may output a signal for displaying a screen to input the second lock release code when the result of comparison at the comparing portion is not confirmed.

By configuring as described above, a user can attempt to reenter the code without having to bring it to a store when the user made an error inputting the lock release code.

The television receiver further has a decoder to produce image data and audio data by decoding a television signal received from a tuner, the control portion may stop the output from the decoder when the result of comparison at the comparing portion is not confirmed.

The control portion may stop the reception of the video signal and the audio signal from an external device when the television receiver is connected to the external device through a cable and the television receiver receives the video signal and the audio signal from the external device, in case the result of comparison at the comparing portion is not confirmed.

The television receiver further has a reset circuit to set to an initial state, and the television receiver may still display an image when it is reset to the initial state in case the result of comparison at the comparing portion is verified.

By configuring as described above, once an user inputs an appropriate code, it will not cause trouble to the user even when it is reset to an initial state later. Also, the objective of theft prevention can be met.

Also, the present invention is a method for preventing theft of electronic devices, the method consisting of the steps of storing a lock release code in a memory of the electronic device, providing information that corresponds to the lock release code stored in the memory to a third party, requesting an input of the information corresponding to the lock release code by the electronic device, comparing input information to the lock release code stored in the memory, and blocking image display of the electronic device when the result of comparison is not confirmed.

By configuring as described above, the electronic device does not operate when the result of comparison is not confirmed. Therefore, by providing the information corresponding to the lock release code only to those who legitimately purchased the electronic device, those who did not legitimately purchase the television receiver (for example, a thief) can not use the electronic device because he or she does not know the information corresponding to the lock release code. Also, there is no worth of reselling because it can not be used. In this way, thieves are demotivated, and the damage of thefts are decreased.

Also, by configuring as described above, there is no need for stores to install special devices or jigs at cash registers or store exits to prevent thefts. Thereby a decrease of the cost for theft prevention, and also a decrease of the cost from the stand point of store space that can now be used for other purposes or store spaces can now be smaller. Also, there is no need for instructing store clerks how to operate antitheft devices. In the case of the present invention, if the information corresponding to the lock release code is configured to be printed automatically on a receipt, there is no need to instruct store clerks on antitheft.

The lock release code stored in the memory may be the number that corresponds to the serial number of the electronic device.

When a thief obtains the information corresponding to the lock release code of the electronic device, other electronic devices can be used if a plurality of electronic devices share the same information and those devices were stolen. Thieves have a tendency of repeating the same theft. However, by configuring an electronic device as described above, thefts of other electronic devices can be prevented even if certain information corresponding to the lock release code has been stolen because each electronic device is provided with a different second lock release code.

The method may further consist of a step for displaying a screen to input the lock release code when the result of comparison is not confirmed.

By configuring as described above, a user can attempt to reenter the code without having to bring it to a store when the user made an error inputting the lock release code.

The electronic device may further consist of steps of generating image data and audio data by decoding a television signal received from a tuner, and stopping the operation of a decoder when the result of comparison is not confirmed.

The electric device may further have a step for receiving the video signal and the audio signal from the external device through the cable, and a step for stopping the reception of the video signal and the audio signal from the external device when the result of comparison is not confirmed.

The electronic device further has a function to set to an initial state, and the electronic device may still display an image when it is reset to the initial state in case the result of comparison is verified.

By configuring as described above, once an user inputs an appropriate code, it will not cause trouble to the user even when it is reset to an initial state later. Also, the objective of theft prevention can be met.

Further, a step for printing out the information corresponding to the lock release code at the time of sale of the electronic device may be included.

Also, the present invention is a method for preventing theft of a camera provided with an image pick up device, the method consisting steps of storing a lock release code in a memory of the camera, providing information corresponding to the lock release code stored in the memory to a third party, reading the information correspond to the lock release code with the camera, comparing the information read by the camera to the lock release code stored in the memory, and blocking the use of the camera when the result of comparison is not confirmed.

By configuring as described above, the information can be read by the CCD camera, thus the input operation can be made easily without having to trouble an user compared to input using buttons and so on. Also, the camera will not operate by the number randomly input by a thief.

DETAILED DESCRIPTION OF INVENTION

Figure 1:
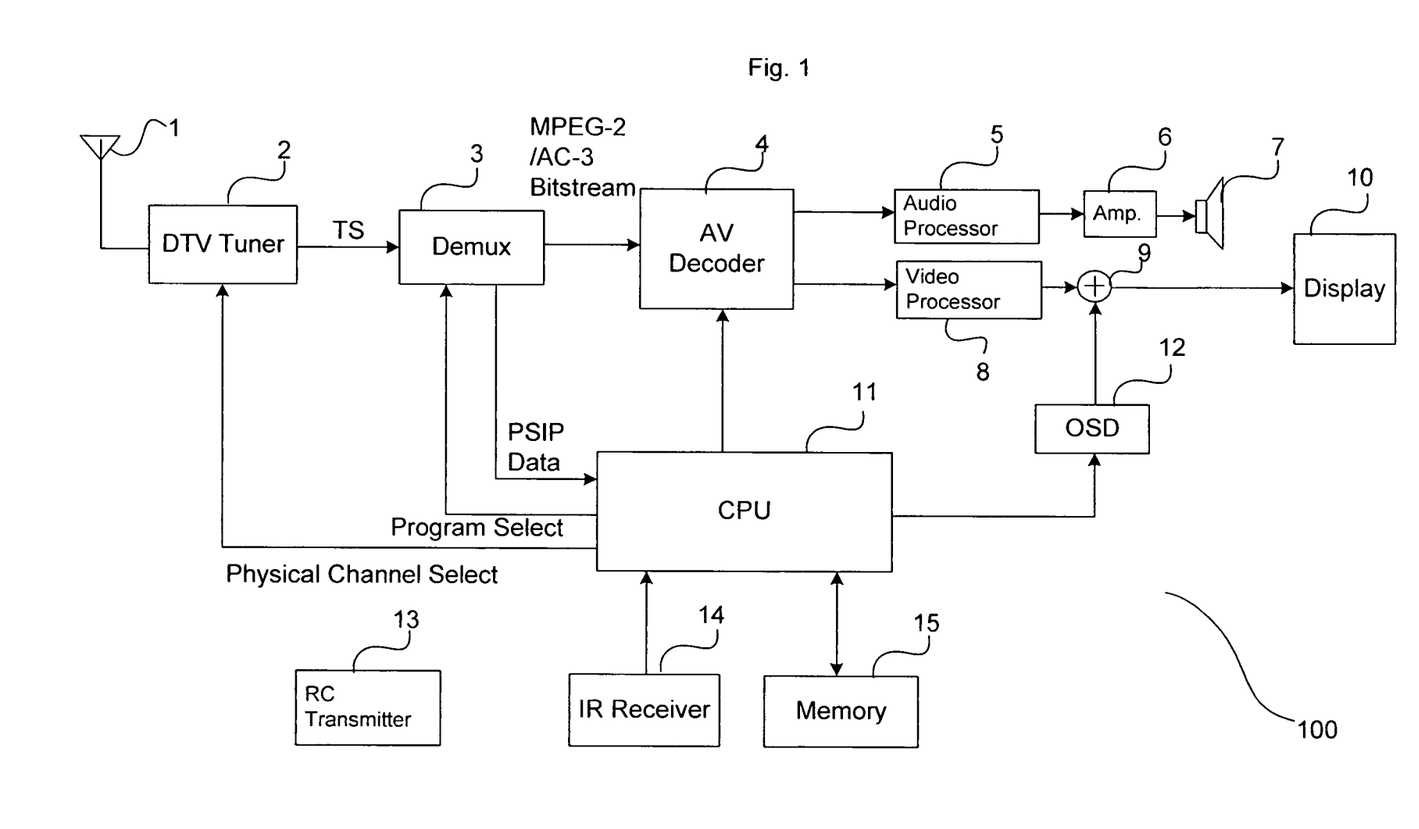
FIG. 1 is a block diagram of a television receiver according to the present invention.

FIG. 1 shows a block diagram of a television receiver 100 according to the present invention. In this embodiment, an U.S. digital television receiver which receives an ATSC signal is described as an embodiment.

A terrestrial antenna 1 receives digital terrestrial broadcasting wave, and supplies a received signal to a digital terrestrial tuner 2. The tuner selects a physical channel by a channel select signal from a CPU or a microprocessor 11. The digital terrestrial tuner 2 retrieves a specific frequency signal from a high frequency digital modulation signal 8VSB (8-level vestigial sideband modulation) including video/audio data by this channel select process. Also, the digital terrestrial tuner 2 is provided with a 8VSB demodulation circuit and alike to demodulate the digital modulation signal of selected physical channel and outputs a transport stream TS.

A demultiplexer (DEMUR) 3 divides the transport stream TS received from the digital terrestrial tuner 2 into a video stream of MPEG-2 and an audio stream of AC-3, PSIP (Program and System Information Protocol) data upon receiving a program select signal from CPU 11 by dividing in a predetermined packet. The demultiplexer 3 supplies the video stream and the audio stream to an AV decoder 4, and PSIP data which includes program information, is supplied to the CPU 11.

*AC-3 is a registered trade mark of Dolby Laboratories Licensing Corporation.

The CPU 11 performs various controls of the television receiver, as well as processing of the PSIP data, and processing of remote control signals described later. A memory 15 is connected to the CPU 11, and the memory 15 stores various data including the program information and a release code described later.

A plurality of cannels are multiplexed in the transport steam TS, and the process of selecting an arbitrary cannel from these can be made by retrieving the data such as which packet ID in the transport stream TS is used to multiplex.

An AV decoder 4 is provided with a MPEG video decoder for decoding the MPEG-2 bit stream, and an AC-3 decoder for decoding the audio stream (AC-3 bit stream). The video data generated by the decoder of AV decoder 4 is output to a video processor 8, and audio data is output to an audio processor 5.

The video processor 8 receives the video data from the AV decoder 4 and generates a video signal by performing D/A conversion. The audio processor 5 receives the audio data output from the AV decoder 4 and generates an analog audio signal by performing D/A conversion.

An OSD (On Screen Display) circuit 12 outputs a video signal to an adder 9 based on the character information instructed to output from the CPU 11. The adder 9 incorporates the video signal based on the bitmap data into a reception video signal, and supplies this video signal to a display 10, such as a LCD.

The display 10 displays images according to the video signal supplied from the video processor 8. Also, the analog audio signal from the audio process circuit 5 is output from a speaker 7 after being amplified with an amplifier 6.

A remote control transmitter 13 is the transmitter to transmit various instructions to the digital television receiver. When a key (not shown) provided to this remote control transmitter 13 is operated, an IR (Infrared) signal (remote control signal) which is an instruction corresponding to the key, is transmitted from a light emitting portion (not shown). A IR receiver 14 receives the signal light, transfers it into an electrical signal, and supplies it to the CPU 11.

Figure 2:
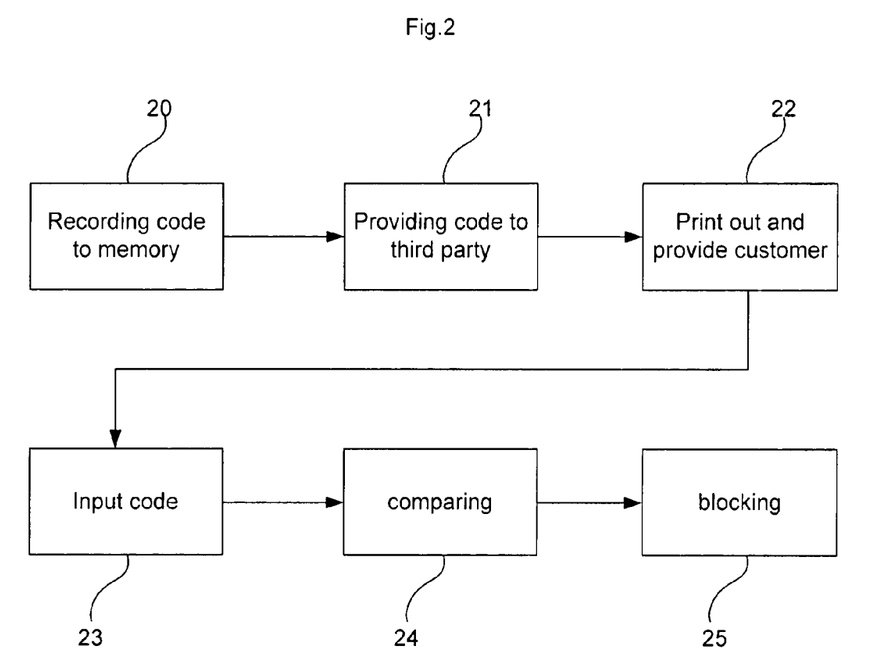
FIG. 2 shows a procedure to block an image in case a television receiver is stolen.

FIG. 2 shows a procedure up to block an image in case a television receiver is stolen. First, store a lock release code (also referred as a first lock release code) in a memory provided to a television receiver in a manufacturing process of the television receiver (step 20). And, supply information (also referred as a second lock release code) corresponding to the lock release code stored in the memory to a third party (step 21). The order of steps 20 and 21 may be opposite.

The lock release code may be in any form. For example, it may be a five or seven digit number and one or more special characters. The lock release code may be a number corresponding to the serial number of television receiver. For example, a number that is a reverse sequence of the serial number, a number that is staggering the serial number by one digit, a number created by the serial number with a random number, or a serial number of a LCD panel or a mother board.

The third party may be, for example, a store that sells the television receivers, or a data retention company on the internet.

Next, the information corresponding to the lock release code is communicated to a purchaser of the television receiver from the third party (step 22). The method for communication may be in any form. For example, the information corresponding to the lock release code may be communicated to the purchaser from the store or the retention company through the internet. In such case, the purchaser transmits the serial number of the television receiver to the store or the retention company through the internet, and the store or the retention company receiving the information may communicate the information corresponding to the lock release code though the internet. Instead of the internet, such communication may be made though the mail. Also, in case a purchaser or a user lost the information corresponding to the lock release code, the information may be obtained again by contacting a manufacturer of the television receiver or a web site of a manufacturer who sells the television receiver.

Also, it is not limited to the serial number for a purchaser to transmit to the store or the retention company to obtain the information corresponding to the lock release code, it may be anything. For example, it may be personal information to prove the purchaser, such as name, telephone number, or address of the purchaser. In such case, obtaining the personal information from the purchaser at the store and transmitting it to the place where the information corresponding to the lock release code is retained. And, the information corresponding to the lock release code is transmitted only when the person who has the personal information has access.

On the contrary, when the third party is a store, for example, the information corresponding to the lock release code may be printed out and handed to a purchaser at the time of purchase of a television receiver. Also, installing a device to provide the information corresponding to the lock release code inside or outside of the store, and the information may be provided when reading the receipt of a purchased television receiver into the device.

The information may be handed to a purchaser at any time, for example, it may be handed by a cashier at the time of the purchase of the television receiver. Also, it may be in the doorway of a store. In the present invention, it is not limited to the purchaser of the television receiver to obtain the information corresponding to the lock release code, it may be anyone who has a number to obtain the information.

Next, the television receiver requests an input of the information corresponding to the lock release code (step 23). And, the information and the lock release code stored in the memory are compared as the information is input. (step 24). The determination as to whether the result of comparison is conforming or not may be made based on any standard. The result may be determined to be conforming when the information and the lock release code are completely matched. Also, for example, in case the information corresponding to the lock release code is a symbol and a user draws the symbol on the screen of the television receiver, these may be determined to be conforming not only when both are completely matched but also when there is a small difference. The television receiver may request the information at any time. For example, it may be when the television receiver is turned on.

Further, theft of television receiver may be prevented by performing up to above described comparison (step 24) in a following method. First, scan a serial number of a television receiver at a cash register of a store at the time of purchase of the television receiver which has a lock release code. Then, the scanned information is converted into information corresponding to the lock release code and recorded in a database. When the power of the television receiver is turned on after the purchase, the television receiver searches the database, and downloads the information stored in the database. When the information corresponding to the lock release code is found in the downloaded information, the television receiver is determined to be purchased legitimately. As a result, the lock of the television receiver is released. Thereafter, the television receiver can be used.

Above method is not limited specifically. For example, the time or the place to scan the serial number of the television receiver is not limited specifically. For example, the serial number may be scanned at the exit of a store or in a predetermined place inside or outside of a store after confirming the television is purchased legitimately at the time of the purchase, or after the purchase. Also, the scanning is not limited to the serial number, and it may be anything as long as it can identify the television receiver. For example, it may be date of manufacture for the television receiver. Also, the method for scanning may be in any form. For example, a device integrated into a cash register may be used. Alternatively, a device provided separately from a cash register may be used.

Also, the information corresponding to the lock release code which is converted from the scanned information may be in any form. For example, it may be a plurality of numbers and special characters as the lock release code described above. Also, the scanned information may be recorded in the database without being converted as the information corresponding to the lock release code. Also, the database may be provided to any place. For example, it may be a database retained by a manufacturer of the television receiver. Also, a data retention company exists on the internet, and a database may be provided thereto. Further, the database may be provided to a broadcasting station. The broadcasting station may be in any form. For example, it may be a public broadcasting service (PBS), an all-news channel (CNN), ABC, NBC, or CBS.

Also, the database may be PSIP (Program and System Information Protocol) provided in a broadcasting station. Also, the information downloaded by the television receiver may be any type of information. For example, information contains the information corresponding to the lock release code may be downloaded. Also, only information corresponding to the lock lease code may be downloaded. Further, the television receiver may search for the database at any time. For example, it may be when the power of the television receiver is turned or, it may be a few minutes after that.

The determination as to whether the lock lease code stored in the television receiver and the downloaded information corresponding to the lock lease code are matching or not may be made based on any standard. For example, it may be determined as described in the step 24 above.

When the result of comparison is not conforming, the user is determined to not have purchased the television receiver legitimately and an image display on the television receiver is blocked (step 25). When the result of comparison is conforming, the television receiver displays an image. When the image display on the television receiver is blocked, a display may appear to prompt the user to reenter the information corresponding to the lock release code again. In this way, the display to request accurate input may appear any number of times. However, it is preferably twice or three time.

The method for blocking an image display on the television receiver may be in any form. For example, the image on the television display may be replaced by monochrome images. Also, when a decoder is provided to decode a television signal received from a tuner and generate the video data and audio data, the output of video data from the decoder may be stopped. Also, the image display on the television receiver may be blocked by blocking any connection shown in FIG. 1. Also, when the television receiver is connected to an external device though a cable and the television receiver receives the video signal and the audio signal from the external device, the reception of the video signal and the audio signal from the external device may be stopped.

On the contrary, the television receiver has a reset circuit to set to an initial state, and once the information corresponding to the lock release code and the lock release code is determined to be conforming. In such case, an image may be displayed on the television receiver without having a user to input the information corresponding to the lock release code again even when the television receiver is reset to the initial state.

Figure 3:
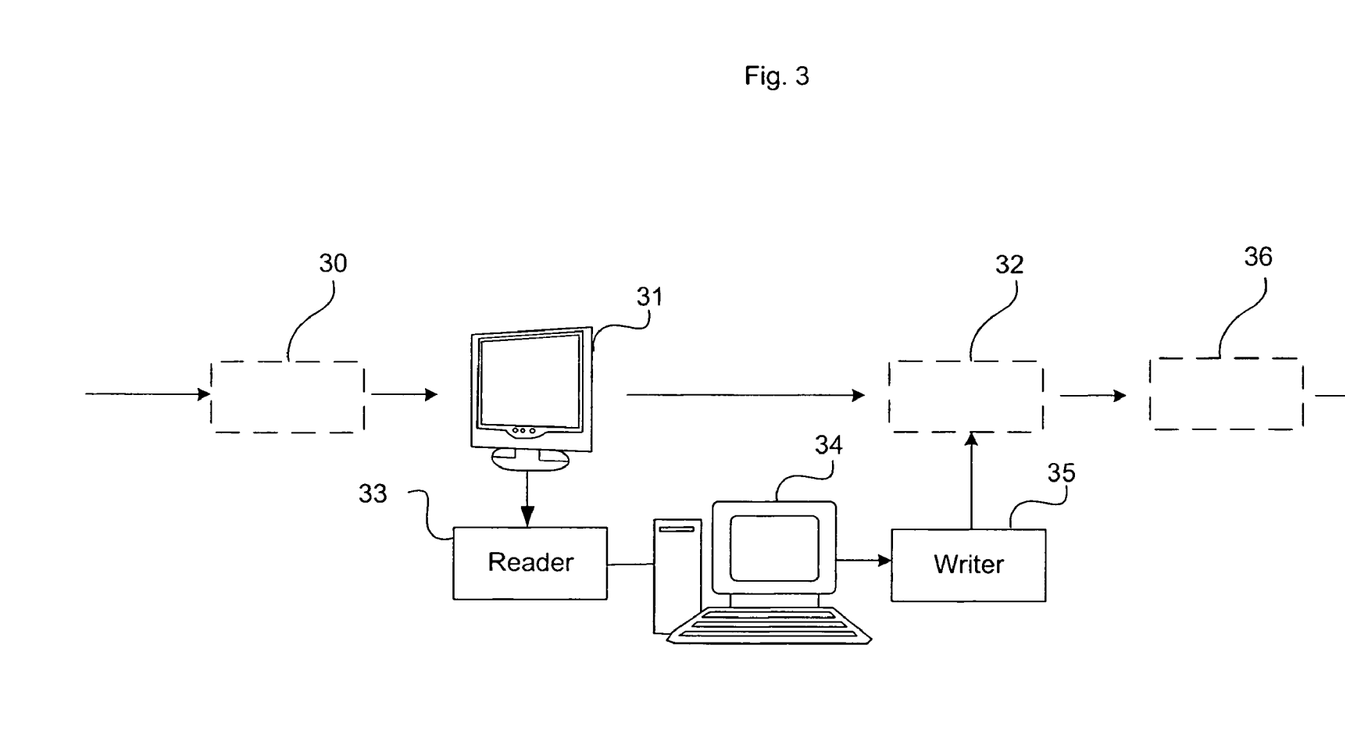
FIG. 3 shows a portion of a production process of a television receiver.

FIG. 3 shows a portion of a production process of a television receiver. Each television receiver manufactured in a factory may be provided with a serial number. The serial number may be provided by attaching a barcode indicating the serial number onto the main body of the television receiver. Also, the code other than a barcode, such as a two-dimensional code, may be used.

As shown in FIG. 3, the television receiver which was applied a predetermined process in a manufacturing process 30 is transferred to the next manufacturing process 31. In the manufacturing process 31, the barcode indicates the serial number provided to the television receiver and is read by a barcode reader 33. And the serial number is input to a PC 34. The PC 34 has software which is capable of generating a sole lock release code against an individual serial number. The PC 34 creates the lock release code with the software. The created lock release code is transfer to a writer 35.

In a manufacturing process 32, the lock release code is written in the memory 15 of television receiver by the writer 35. This writer 35 may be a remote controller transmitting portion to transmit the signal of the lock release code received from the PC 34 as an infrared remote control signal. The lock release code transmitted from the writer 35 is received in the IR receiver 14 of the television receiver and stored in the memory 15 through the CPU 11 (shown in FIG. 1). The television receiver storing the lock release code is delivered as goods (process 36).

In this way, one lock release code corresponds to one serial number and is stored in the television receiver. On the contrary, the information corresponding to the lock release code is generated. The serial number, the information corresponding to the lock release code, and the lock release code are corresponding to each other. Also, the information corresponding to the lock release code and the lock release code are generated to match.

Reading of the serial number may be in any form. For example, an IIC bus may be used. That is, write the serial number in the memory 15 of the television receiver in the manufacturing process 30, and read the serial number into the PC 34 through the IIC bus in the manufacturing process 31.

Generating a lock release code corresponding to the serial number in the PC 34 may be written on the memory 15 of the television receiver by the IIC bus. Also, the information to create the lock release code is not limited to the serial number, it may be anything. It may be the date of manufacture for the television receiver. The method for creating the lock release code is not limited to that of FIG. 3, it may be any method.

Figure 4:
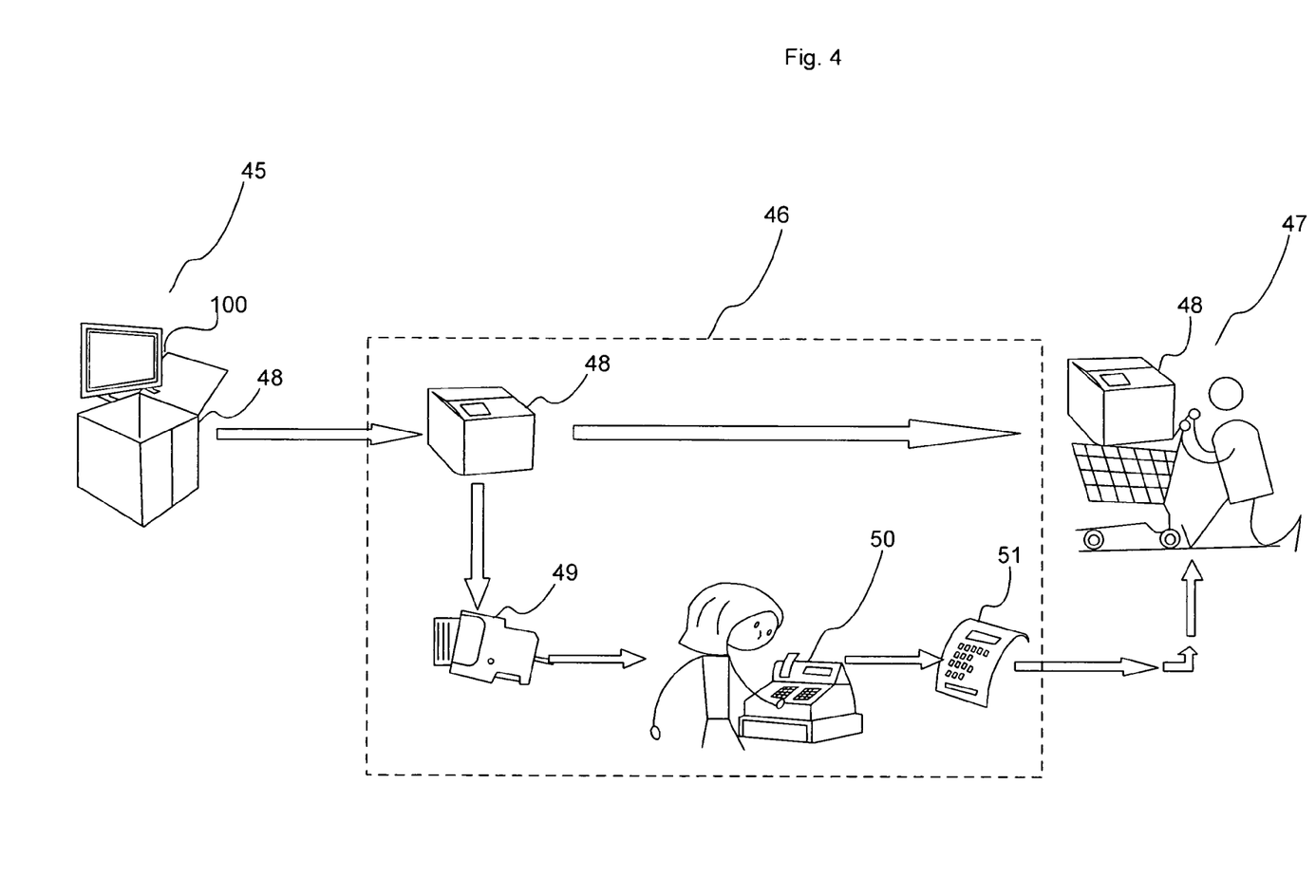
FIG. 4 shows a procedure for issuing information corresponding to a lock release code.

FIG. 4 shows a procedure for issuing the information corresponding to the lock release code. In a manufacturing process 45, the television receiver 100 is packaged. In a sales process 46, the barcode indicating the serial number attached to the packaged television receiver 48 is read by a barcode reader 49. The read serial number is imported to a register device 50. The register device 50 is capable of obtaining the information corresponding to the lock release code against an individual serial number. The obtained information corresponding to the lock release code is printed on a receipt 51 which indicates a record of purchase, and handed to a customer (process 47).

The information corresponding to the lock release code is not necessarily printed on a receipt, and it may be communicated to a purchaser in any form. For example, it may be printed on a form separate from the receipt. Also, reading the serial number is not limited to the barcode reader, it may be transmitted to a register in any form. For example, the serial number may be input to a register directly by a store clerk. Also, instead of transmitting the serial number to the register, the information corresponding to the lock release code may be obtained by transmitting the serial number to another device. Also, the number other than the serial number may be used, or a time to obtain the information corresponding to the lock release code is as explained in FIG. 2, and these may be in any form.

Figure 5:
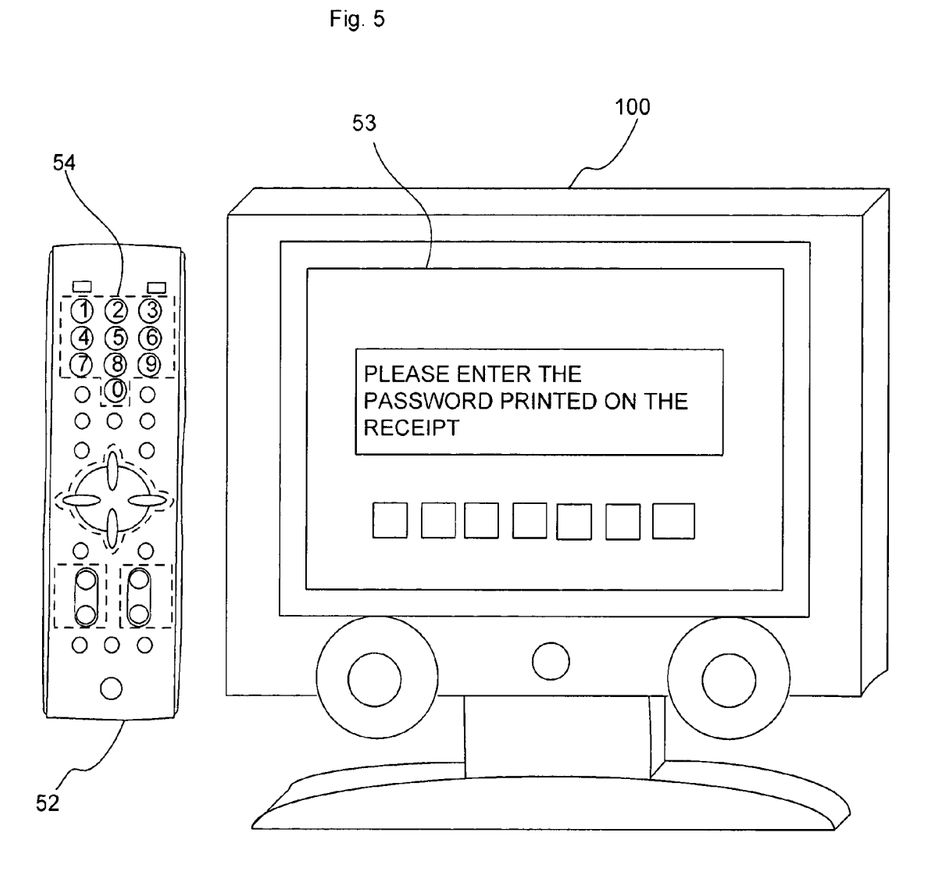
FIG. 5 is an example of a screen in which a television receiver requesting an input of information corresponds to a lock release code.

FIG. 5 shows an example of a screen in which the television receiver is requesting an input of the information corresponding to a lock release code. FIG. 5 shows a television receiver 100 and a remote controller 52. The remote controller 52 has a plurality of inputs 54. The television receiver 100 has a display screen 53. The display screen 53 is displaying "Please enter the password printed on the receipt".

A user inputs the information corresponding to the lock release code using the remote controller 52 according to the instruction of the display screen. When the input information matches to the lock release code stored in the memory of the television receiver 100, an image is displayed on the display screen 53. When it is not matched, there is no image display or audio output. The plurality of inputs 54 include an input to correct the input, an input to reset the television receiver to an initial state, and a conformation key to conform a predetermined item.

The means for inputting the information is not limited specifically, it may be in any form. For example, instead of using the controller, the inputs provided to the television receiver may be used. Also, the display screen to request a user to input the information may be in any form. For example, in case a plurality of numbers exist to input, the display screen shows a few numbers each (for example three each) to be input, and then shows a input screen for the next numbers. Also, numbers may be displayed on the display screen, and a user may select the numbers by touching the screen where the numbers exist. Also, a column to draw a symbol or simple picture may be displayed on the display screen, and the user may draw the information in the column.

The television receiver may request to enter the information at any time. For example, it may be when the power of the television receiver is turned on, or a few seconds after the power is turned on. Also, the input may be confirmed by using a conformation key after inputting a plurality of numbers as the information. In such case, when the conformation key is pressed without inputting all the numbers to be pressed completely, the display screen does not change and it may display a screen prompting to continue the input.

Figure 6:
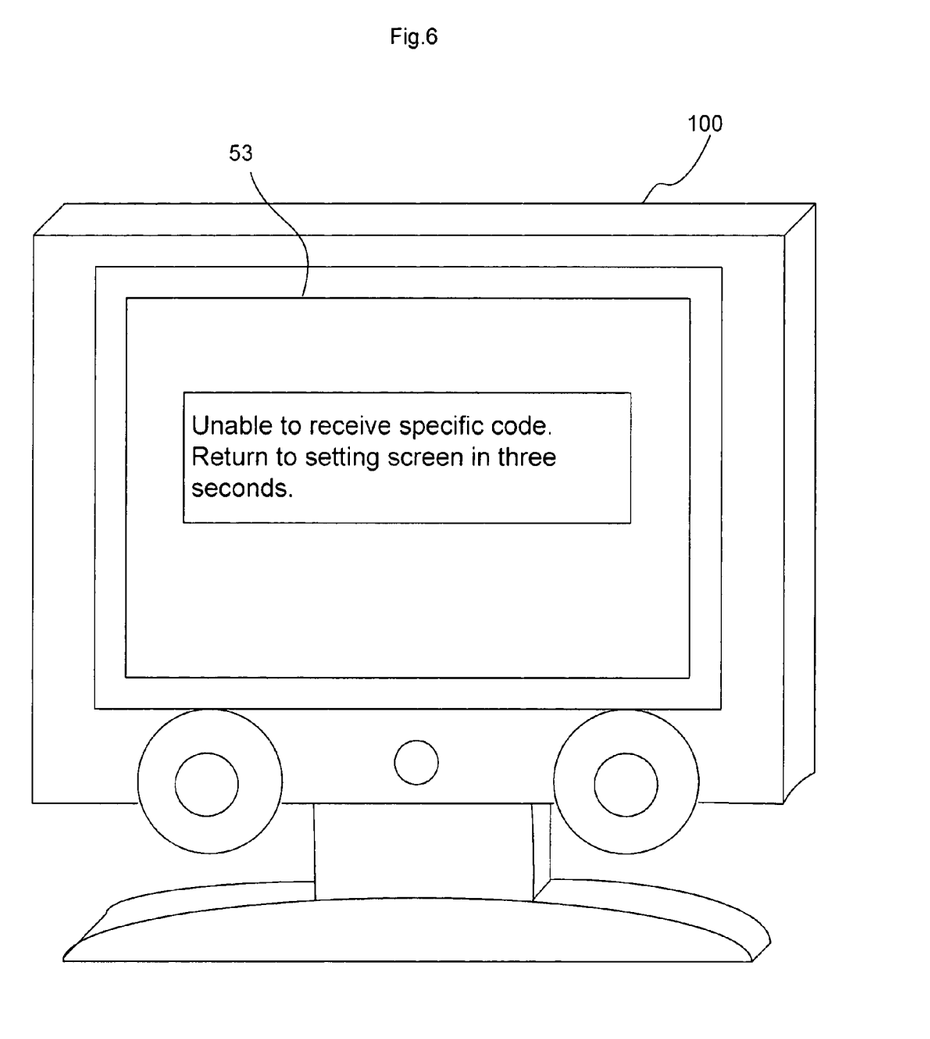
FIG. 6 shows an example when a user inputs information which does not match a lock release code.

FIG. 6 shows an example when a user inputs information which does not match a lock release code. The television receiver 100 has a display screen 53. The display screen 53 is displaying "Unable to receive specific code. Return to setting screen in three seconds". That is, because the user input the information which does not match the lock release code, an image will not be displayed.

When the image display is blocked, a screen to request the user to reenter the information may be displayed. The screen to request reenter may be displayed any number of times, for example, it may be twice or three times. The screen to request reenter may not be displayed. The display in which the image display is blocked is not limited to that of FIG. 6, and it may be in any form. For example, an X mark may be displayed on the display screen. Also, contact information for a third party may be displayed. In such case, the user may be able to obtain the information from the third party by contacting the third party and communicating information, such as serial number, to obtain the information.

Figure 7:
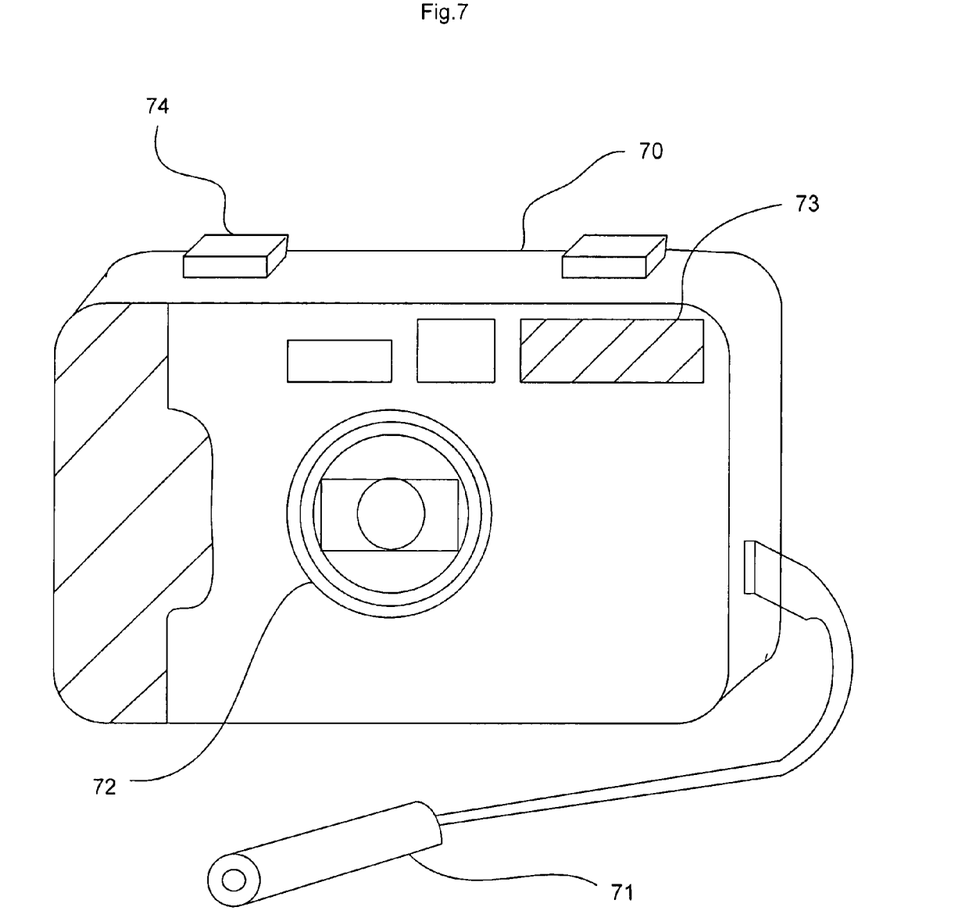
FIG. 7 shows a digital camera with a CCD according to the present invention.

FIG. 7 shows a digital camera with a CCD according to the present invention. A digital camera 70 is provided with a CCD camera 71, a lens 72 to take a picture, a flash 73 to illuminate the subject, and a button 74 to input the timing of the photograph. The digital camera according to the present invention also has the features explained in FIGS. 2 to 6. As a means for importing the information corresponding to the lock release code into the digital camera, for example, the information described on the receipt provided from a store can be read by the CCD camera 71 to import into the digital camera. As for the information, a barcode or a two-dimensional code can be considered Also, providing a digital camera with inputs and the user may input the information using those inputs. Further, when the lens 72 photographs the information, the image is processed in the digital camera, and the information may be imported into the digital camera. When the imported information does not match the lock release code stored in the memory of the digital camera, use of the digital camera is blocked. The method for blocking is not limited specifically, and it may be in any form. For example, the power of the digital camera may be turned off. It may be such that the shutter to protect the lens 72 does not open and scenery can not be viewed from the lens 72. Or the button 74 may be disabled.

Figure 8:
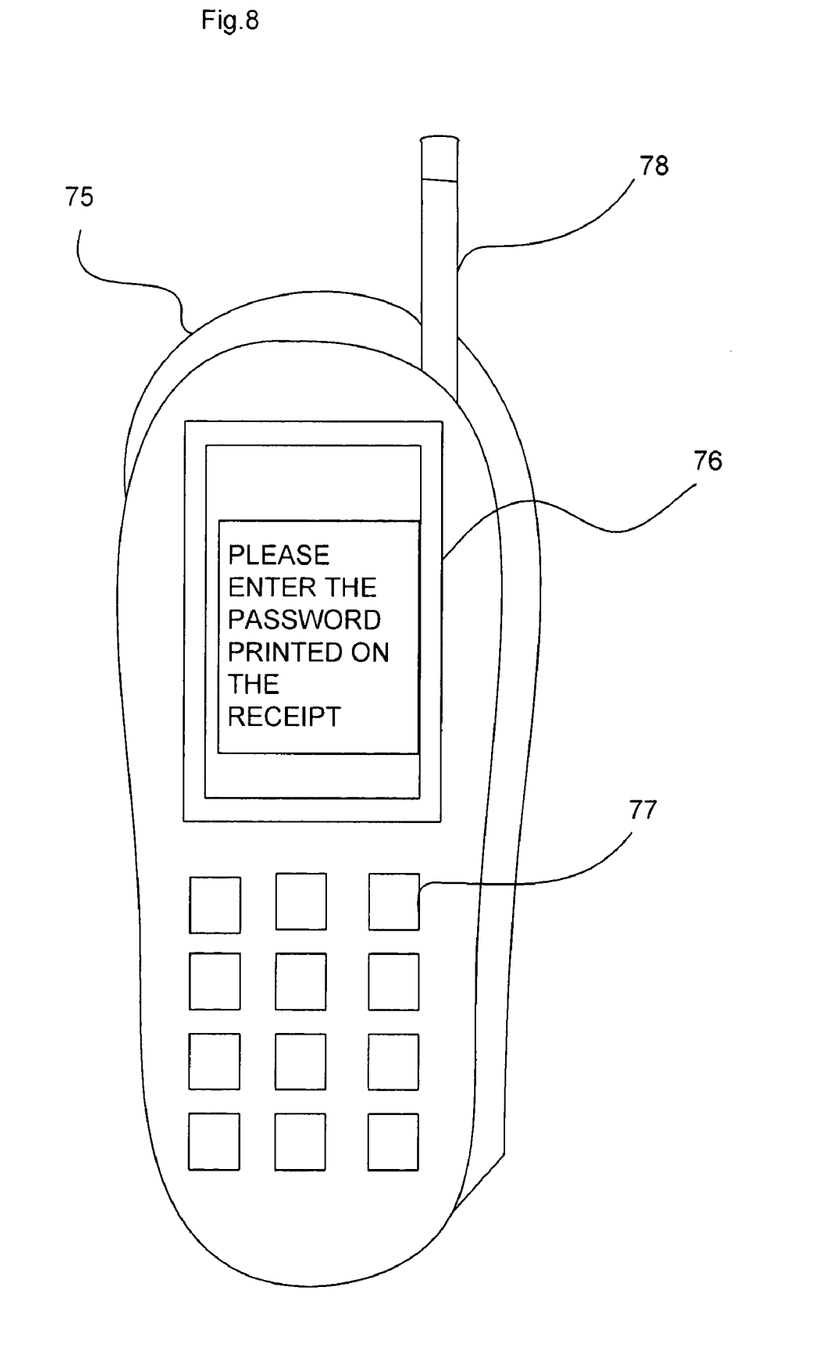
FIG. 8 shows a cellular phone according to the present invention.

FIG. 8 shows a cellular phone according to the present invention. A cellular phone 75 is provided with a display screen 76, a plurality of input buttons 77 and a signal reception antenna 78. The display screen 76 is displaying "Please enter the password printed on the receipt". The cellular phone according to the present invention also has features explained in FIGS. 2 to 6 above. The user inputs the information corresponding to the lock release code according to the instruction on the display screen.

When the information and the lock release code stored in the memory of the cellular phone matches, the cellular phone can be used. The method for disabling the use of the cellular phone may be in any form. For example, reception of a signal from the antenna of the cellular phone may be blocked. Also, the function of input buttons on the cellular phone may be disabled. Or, the display screen may not show an image.

Figure 9:
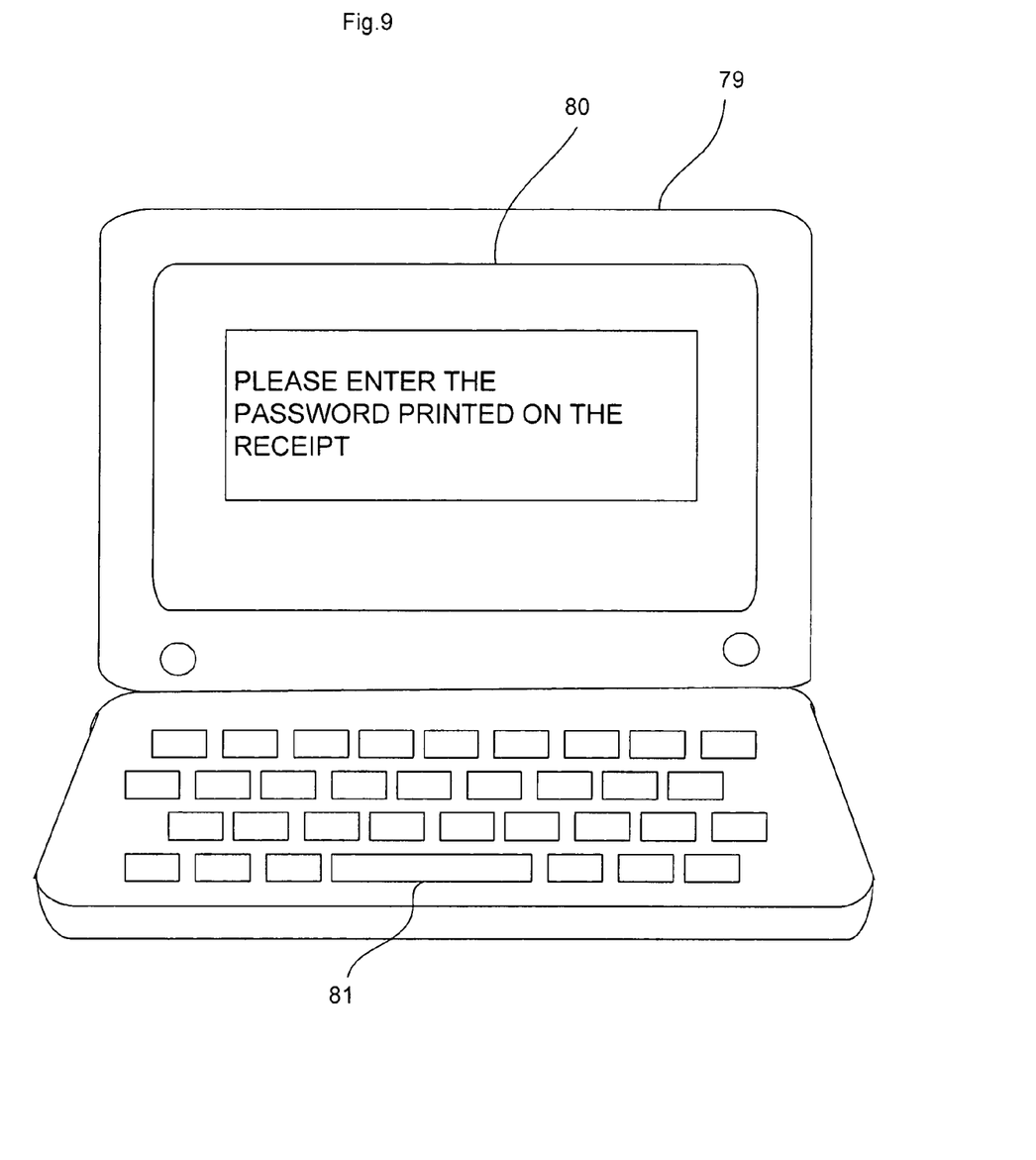
FIG. 9 shows a personal computer according to the present invention.

FIG. 9 shows a personal computer according to the present invention. The personal computer 79 is provided with a display screen 80, and a plurality of input buttons 81. The display screen 80 is displaying "Please enter the password printed on the receipt". The personal computer according to the present invention also has features explained in FIGS. 2 to 6 above. The user inputs the information corresponding to the lock release code according to the instruction on the display screen. When the information and the lock release code stored in the memory of the personal computer match, the personal computer can be used. The method for disabling the use of the personal computer may be in any form as described above.

Figure 10:
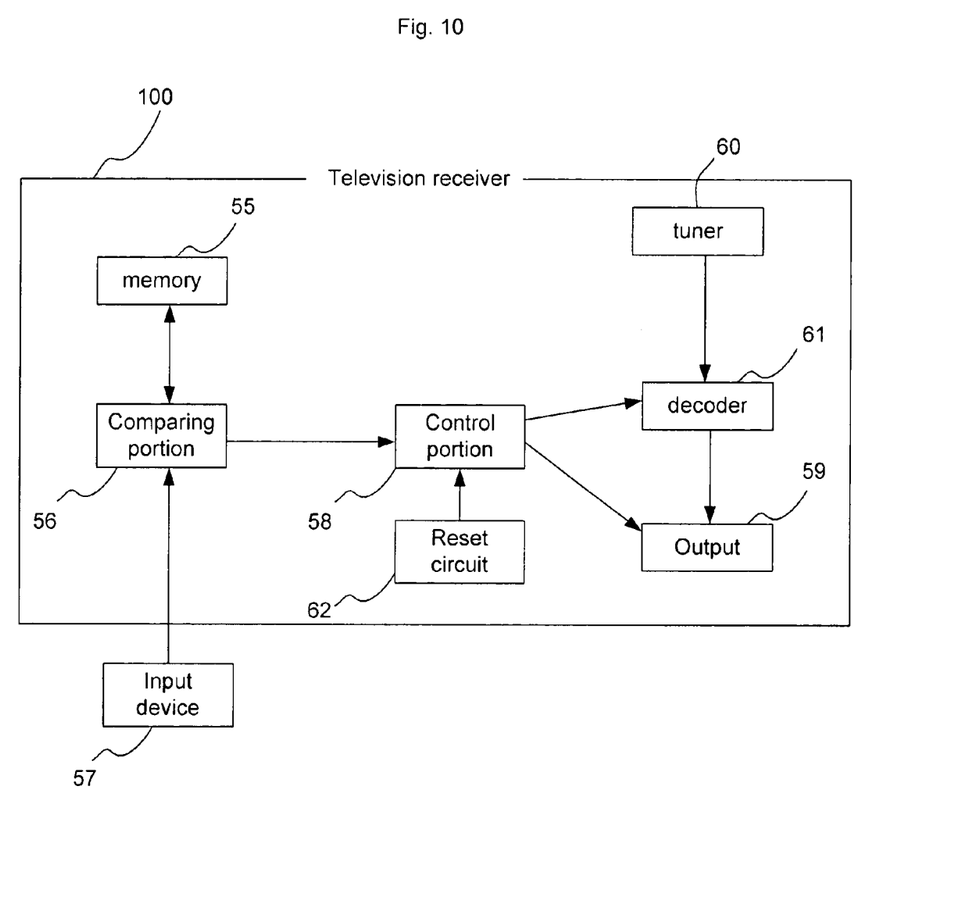
FIG. 10 shows a system that operates a television receiver according to the present invention.

FIG. 10 shows a system which operates the television receiver according to present invention. The system has a television receiver 100 and an input device 57. The television receiver 100 has a memory 55, a comparing portion 56, a control portion 58, an output portion 59, a tuner 60, a decoder 61 and a reset circuit 62. A first lock release code is stored in the memory 55.

First, when a second lock release code is input in the input device 57, the information is transmitted to the comparing portion 56. Upon receiving the information, the comparing portion 56 accesses the memory 55 and obtains the first lock release code. And the comparing portion 56 compares the first lock release code and the second lock release code. When the result of comparison is conforming, the comparing portion 56 transmits an instruction enabling the operation of television receiver to the control portion 58. The control portion 58 which received the instruction outputs a signal enabling the operation of the television receiver from the output portion 59. When the signal is output, the television receiver starts to display images and to output sound.

When the result of the comparison is not conforming, the comparing portion 56 transmits an instruction disabling the operation of the television receiver to the control portion 58. The control portion 58 which received the instruction cancels the signal output enabling the operation of the television receiver. As a result, the television receiver does not display an image or output sound. In this case, the control portion 58 may output a signal from the output portion 59 to display a screen to input the second lock release code.

Generally, the television signal is transmitted from the tuner 60 to the decoder 61, decoded in the decoder 61, and converted into video data and audio data. And these data are output from the output portion 59. When the result of comparison is not conforming, the control portion 58 can access the decoder 61 to stop the output of data. As a result, the television receiver does not display images or output sound.

Meanwhile, there is a case where an instruction to reset the television receiver to an initial state is transmitted from the reset circuit 62 to the control portion 58, and the television receiver returns to the initial state. In this case, once the result of comparison is determined to be conforming, the control portion 58 may output the signal enabling the operation of the television receiver from the output portion 59 even when the control portion 58 does not receive the instruction enabling the operation of the television receiver.

In the system above, the television receiver 100 and the input device 57 may be integrated. Also, instead of embedding the tuner 60 on the television receiver 100, the tuner 60 and the television receiver 100 may be provided separately.

Figure 11:
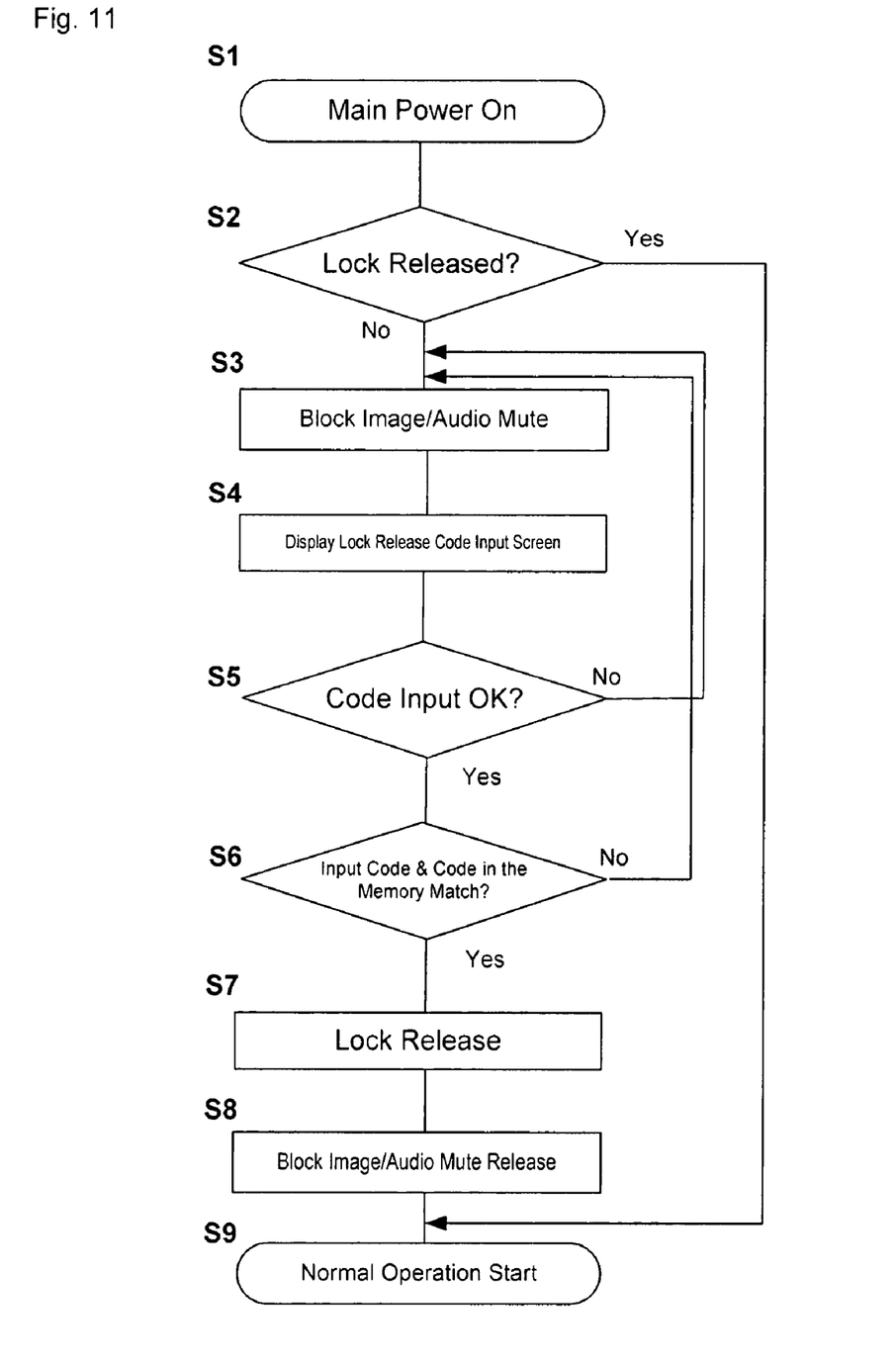
FIG. 11 shows an example of a flowchart of operation of a television receiver according to the present invention.

FIG. 11 shows an example of a flowchart for the operation of the television receiver according to the present invention. First, when the power of the television receiver is turned on (S1), the CPU of the television receiver checks if the lock for images and so on is released or not (S2). If the lock is determined to be released, the television receiver starts channel select preset operation, image display, and audio output (S9). When the CPU of the television receiver determines that the lock for the image display and so on is not released, the image is blocked and the sound is muted (S3).

Thereafter, for example, a display requesting an input of the information corresponding to the lock release code displayed on the screen of the television receiver as explained in FIG. 5 (S4). The user inputs the information corresponding to the lock release code by using a remote controller and so on according to this instruction. Then, the television receiver determines whether there is an input from the user or not (S5). When there is no input, the image and the audio are blocked (S3).

When there is an input, a determination is made at the comparing portion of the television receiver as to whether the information conforming the lock release code or not (S6). When determined to be not conforming, images and audio are blocked (S3). When determined to be conforming, the lock for the image and the audio is released. When the lock is released, the image block and the audio mute are released (S8), the television receiver starts a channel select preset operation, image display, and audio output (S9).

Figure 12:
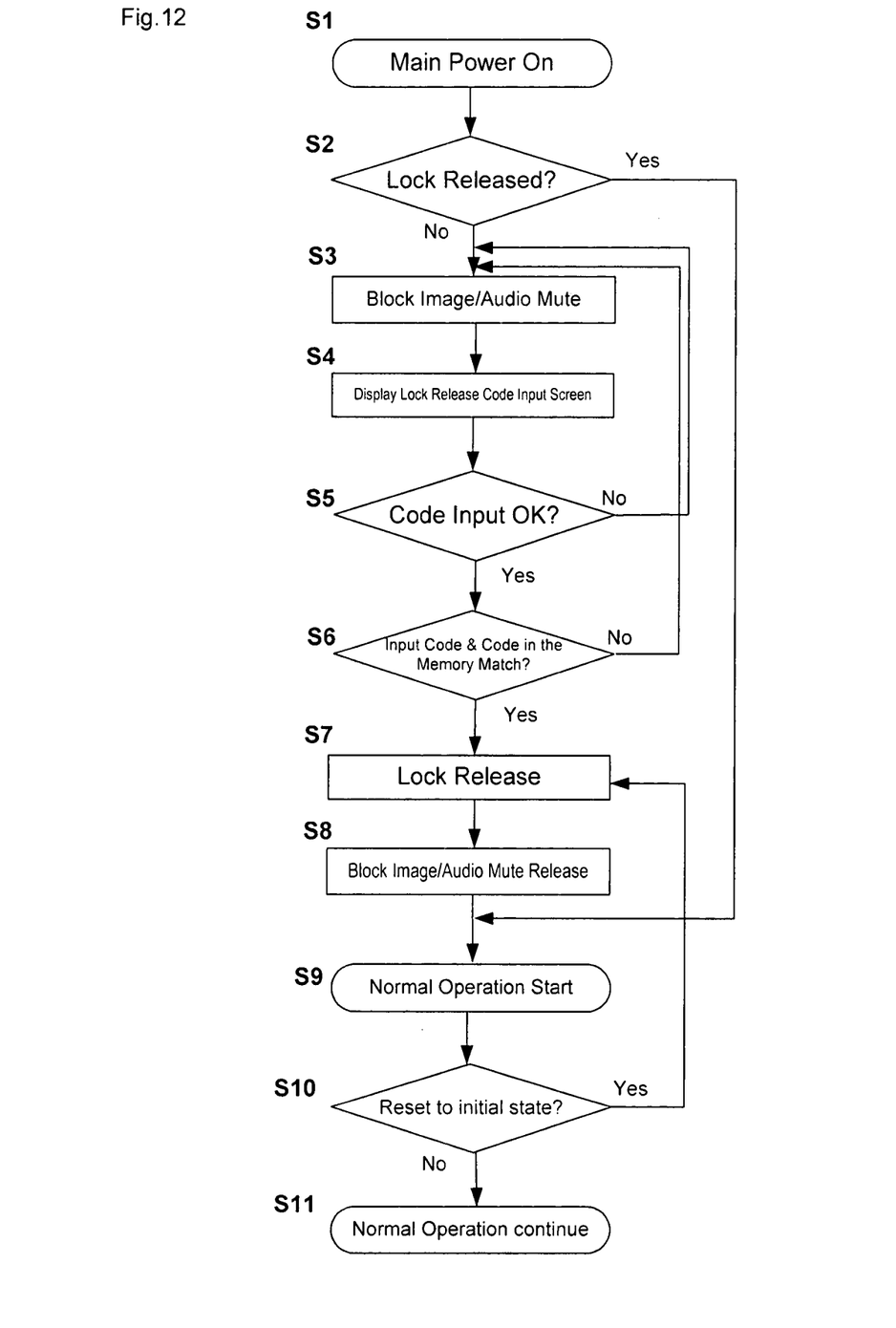
FIG. 12 shows an example of flowchart of operation of a television receiver according to another embodiment of the present invention.

FIG. 12 is an example of a flowchart for an operation of the television receiver according to the present invention. From steps 1 to 9, the television receiver operates as FIG. 11. After the television receiver starts to display images and output audio (S9), a determination is made as to whether there is an instruction to return the television receiver to an initial state or not (S10).

When it is determined there is no instruction to reset to the initial state, the image display and the audio output are continued (S11). When it is determined there is an instruction to reset to the initial state, all the functions except for the lock release for the images and audio are reset to the initial state (S7). That is, once the lock is released for the images and the audio, they are not locked again even when the television receiver is reset to the initial state.

The present invention is not limited to the embodiment above. For example, only a part of electronic devices including a television receiver is explained in the FIGS. 1 to 12, however, the contents explained in FIGS. 1 to 12 may be applied to all the electronic devices. For example, a VCR, DVD player, camcorder, vacuum cleaner, electric heater, air conditioner, rice cooker, digital camera, land-line phone, cellular phone, personal computer, or electric fan may be considered as an electronic device. When a lock is not released for the product without a display screen, such as a vacuum cleaner or rice cooker, the product can not be used. Also, the electronic devices may be provided with a solar cell.

What is claimed is:

1. A television receiver comprising:
   a memory containing a first lock release code and an input device to input a second lock release code,
   a comparing portion for comparing the second lock release code input by said input device to the first lock release code stored in said memory;
   a control portion to output a signal allowing said television receiver to operate when the result of the comparison at said comparing portion is verified, wherein said control portion checks as to whether a result of the comparison at said comparing portion is verified or not, and blocks an image display of the said television receiver when the result is not confirmed; and
   a reset circuit to set to an initial state, wherein said television receiver still displays an image when it is reset to the initial state in case the result of the comparison at said comparing portion is verified.

2. The television receiver according to claim 1, wherein the first lock release code stored in said memory is a number corresponding to a serial number of said television receiver.

3. The television receiver according to claim 2, wherein the first lock release code corresponding to said serial number is stored in said memory at a production process of said television receiver.

4. The television receiver according to claim 1, wherein said second lock release code is distributed at a time of purchase of said television receiver.

* * * * *